No. 799,386. PATENTED SEPT. 12, 1905.
E. JANIK.
COIN DELIVERING DEVICE FOR CASH INDICATORS.
APPLICATION FILED APR. 6, 1903.
6 SHEETS—SHEET 3.
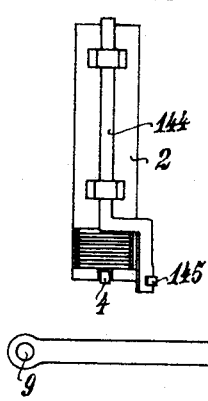
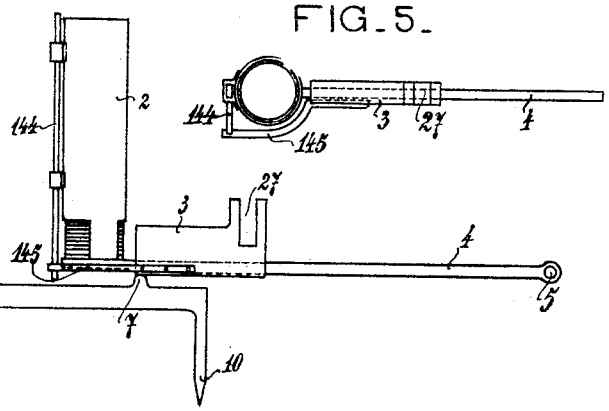
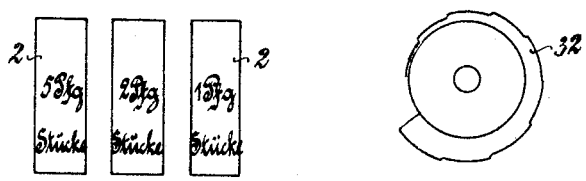
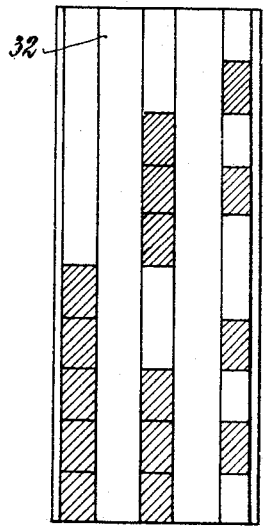
Null
1 Pfg = 1 à 1 Pfg
2 " = 1 à 2 "
3 " = 1 à 1 " + 1 à 2 Pfg
4 " = 2 à 2 "
5 " = 1 à 5 "
6 " = 1 à 5 " + 1 à 1 "
7 " = 1 à 5 " + 1 à 2 "
8 " = 1 à 5 " + 1 à 2 " + 1 à 1 Pfg
9 " = 1 à 5 " + 2 à 2 "
Witnesses
H. van Heerenbrinck
Thomas Kirkpatrick
Inventor
Edward Janik
by Henri van Oldenneel
Attorney

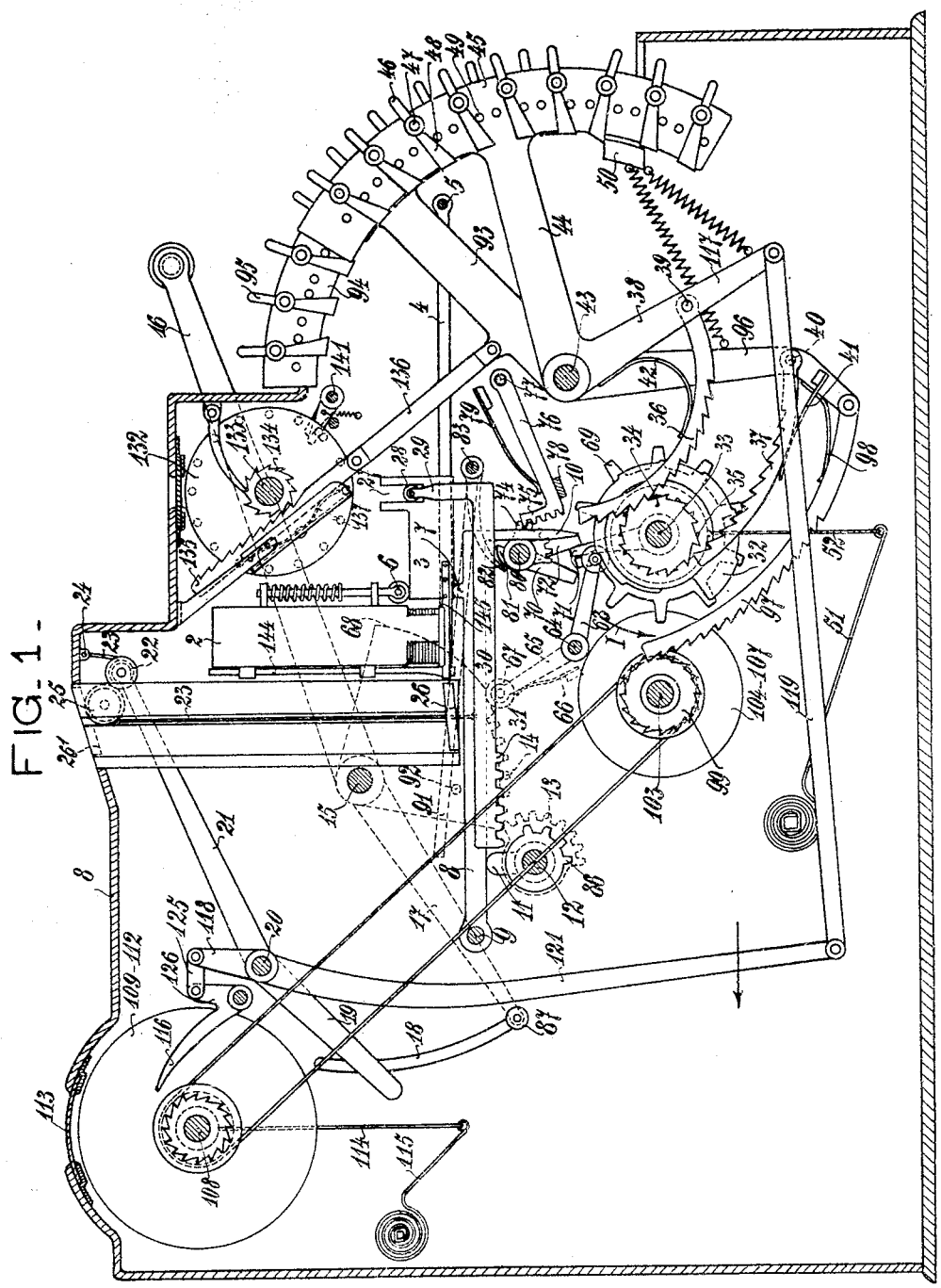

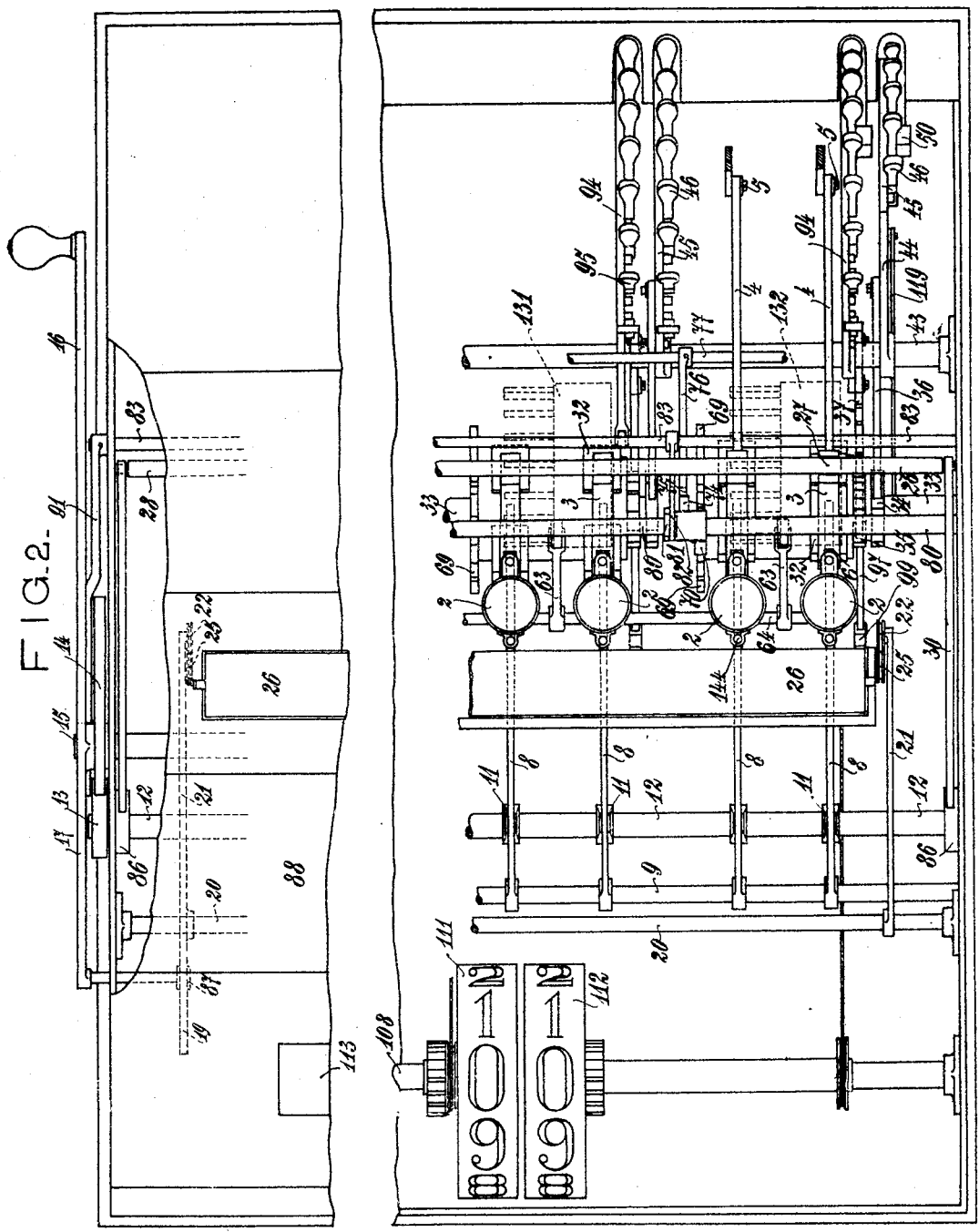

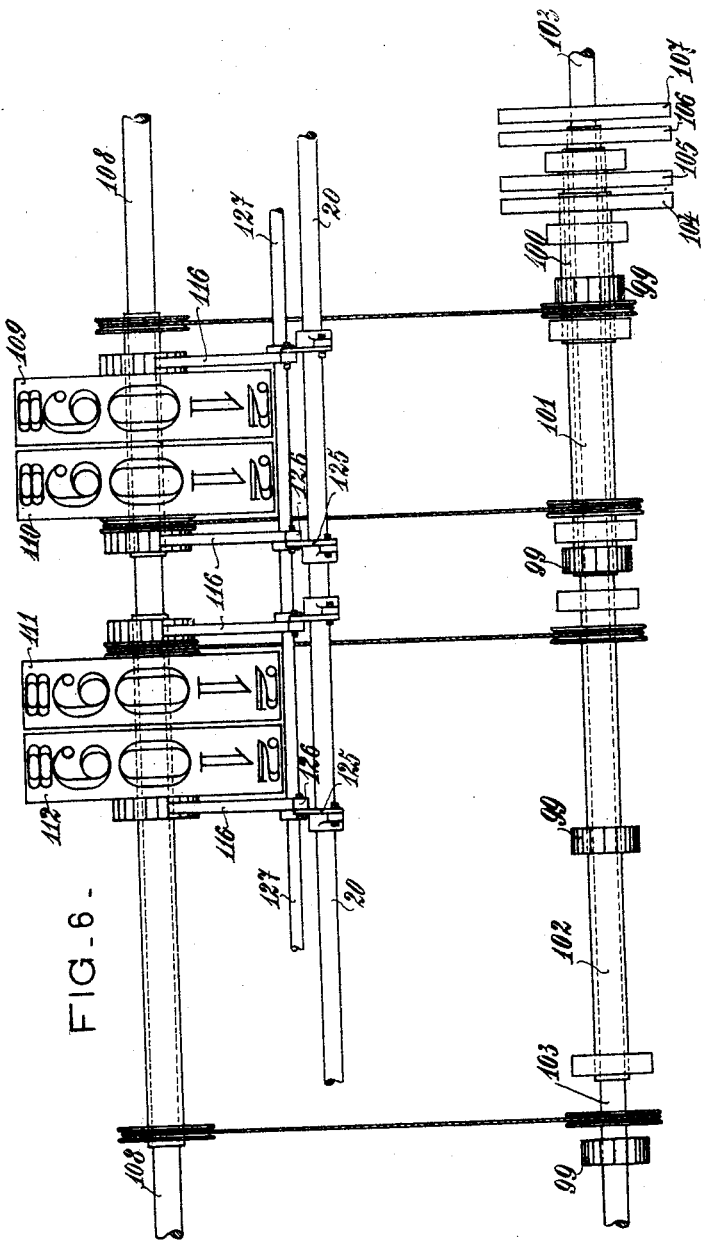

No. 799,386.  
PATENTED SEPT. 12, 1905.  
E. JANIK.  
COIN DELIVERING DEVICE FOR CASH INDICATORS.  
APPLICATION FILED APR. 6, 1903.  
6 SHEETS—SHEET 5.
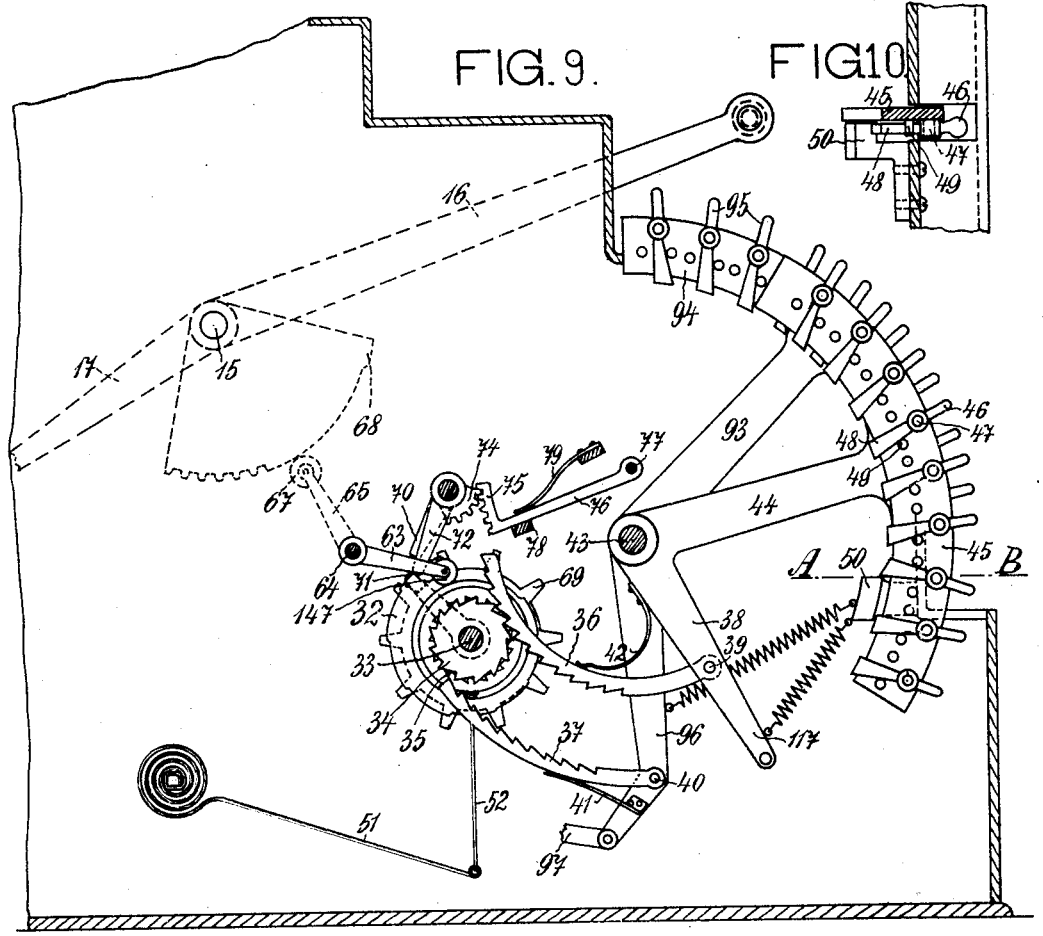
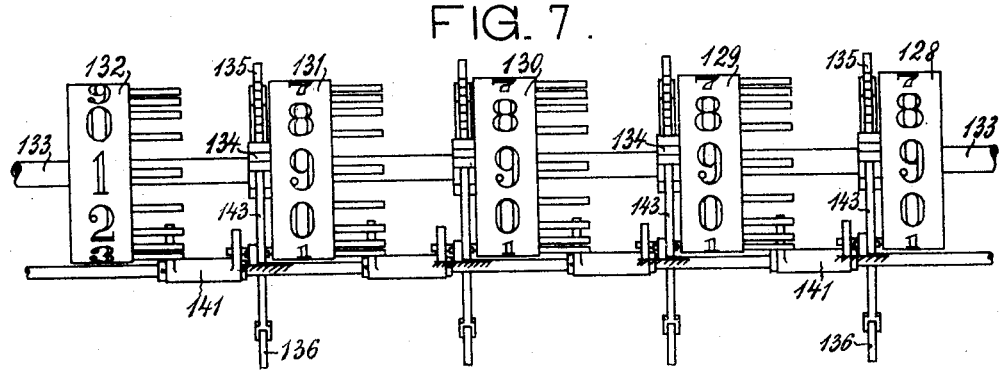

No. 799,386. PATENTED SEPT. 12, 1905.
E. JANIK.
COIN DELIVERING DEVICE FOR CASH INDICATORS.
APPLICATION FILED APR. 6, 1903.
6 SHEETS—SHEET 6.
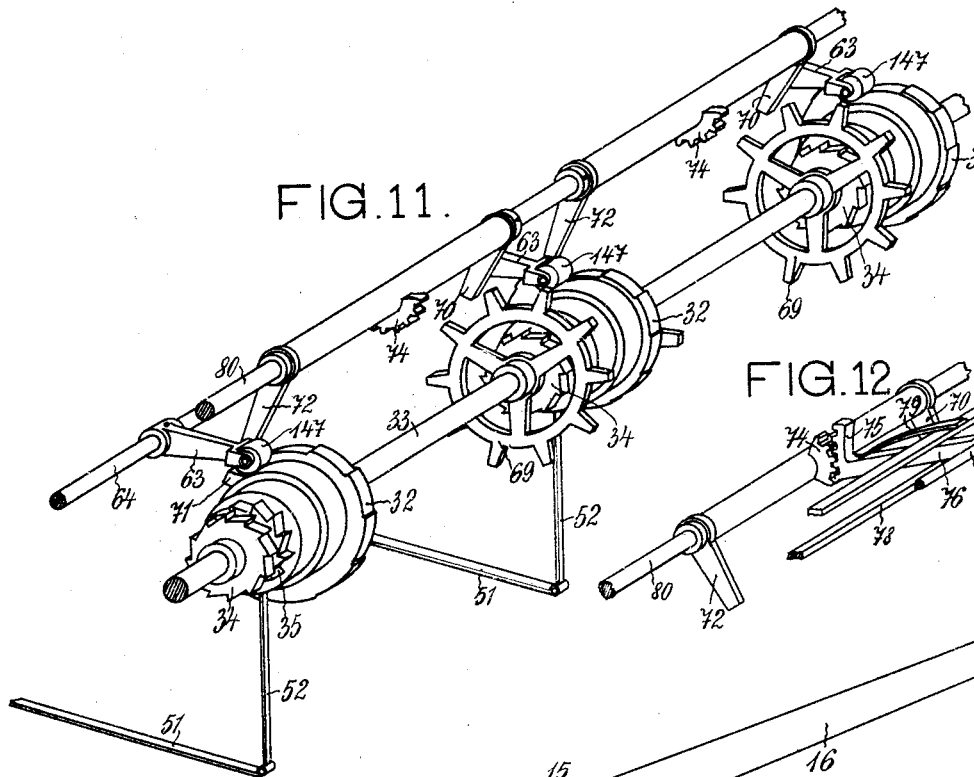
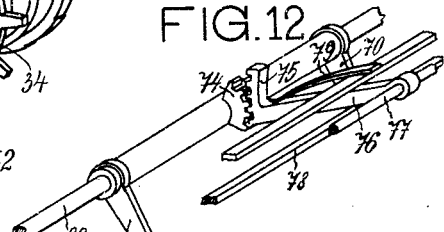
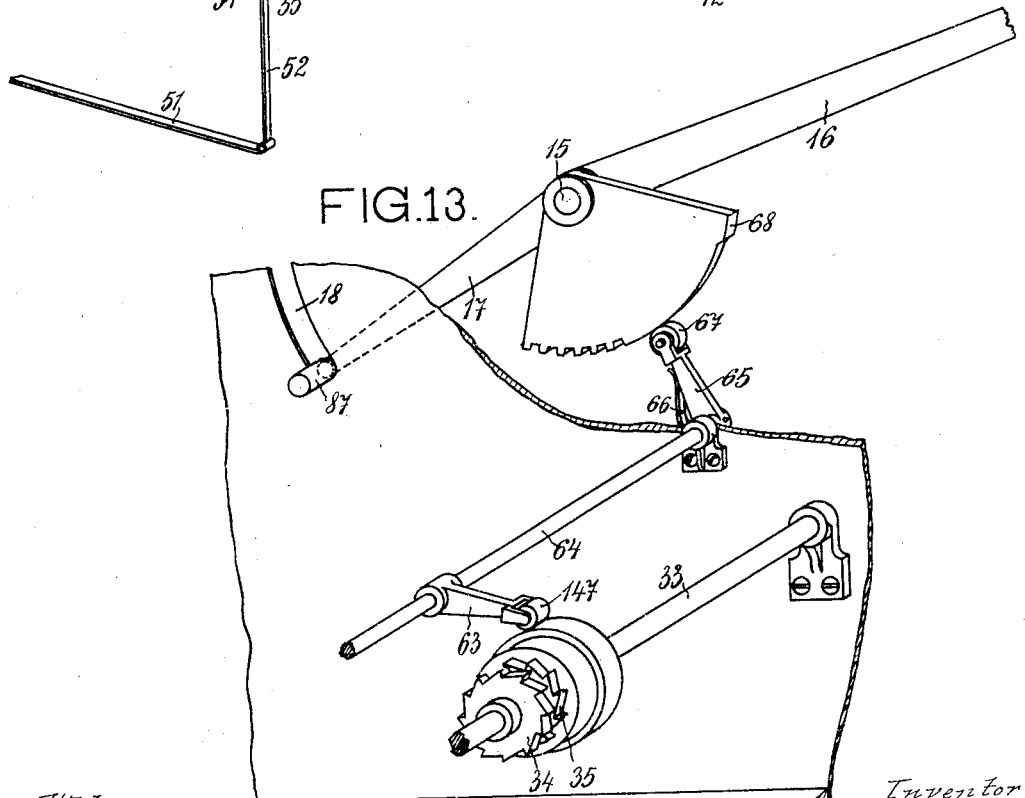
Witnesses
Inventor
Eduard Janik

UNITED STATES PATENT OFFICE.

EDUARD JANIK, OF LEMBERG, AUSTRIA-HUNGARY.

COIN-DELIVERING DEVICE FOR CASH-INDICATORS.

No. 799,386.        Specification of Letters Patent.        Patented Sept. 12, 1905.

Application filed April 6, 1903. Serial No. 151,324.

*To all whom it may concern:*

Be it known that I, EDUARD JANIK, a subject of the Emperor of Austria-Hungary, residing at 2 Maistrasse, Lemberg, Galicia, in the Empire of Austria-Hungary, have invented new and useful Improvements in Coin-Delivering Devices for Cash-Indicators and Like Apparatus, of which the following is a specification.

My invention relates to devices which are designed to give change for and pay out amounts, and in the case of cash-registers besides effecting the registration of the amounts of the purchase to enable the difference between such amounts and those which have been paid in to be delivered by throwing the corresponding coins from receptacles containing the same.

In the device constructed according to my said invention the coin-ejectors of the coin-receptacle are first set to the amounts paid in, either directly or by means of appropriate adjusting devices, and then set back to correspond to the amount of the purchase, so that in their operation the ejectors occupy the position corresponding to the balance which has to be delivered.

In the accompanying drawings I have shown how my invention may be conveniently carried into effect.

Figure 1 is a vertical transverse section of the coin-delivering device. Fig. 2 is a plan of the device with the top of the casing partly removed. Fig. 3 is a side elevation, showing the means for setting the ejector and the coin-receptacle. Fig. 4 is a front elevation, and Fig. 5 a plan of the same. Fig. 6 is a partial plan showing the indicating device in diagram. Fig. 7 is a similar plan of the adding device. Fig. 8 shows in diagram the one-cent group and the development of the stepped disks with the coin-receptacles thereover. Fig. 9 is a section similar to Fig. 1, but omitting some of the parts to show the others more clearly. Fig. 10 is a detail cross-section on the line A B, Fig. 9. Fig. 11 is a perspective view of three of the stepped disks and the coöperating parts. Fig. 12 is a detail of the same. Fig. 13 is a perspective view showing the means for releasing the brake-rolls from the stepped disks.

The receptacles 2, wherein the coins to be paid out are piled up, are arranged side by side in a row. In their lower part the coin-receptacles 2 have an aperture for the delivery of the coins and another aperture arranged opposite the former and designed for the entrance of a slide forming the ejector 3. Generally the aperture for the delivery of the coins from the coin-receptacles is closed by a slide 144, which, as shown in the drawings, opens upwardly. The slide 144 has for its object to prevent more coins being thrown out than are to be delivered each time. This slide is set at the same time as the ejector and prevents the coins which lie above those to be thrown out from being carried away by friction. For this purpose a catch 145 on the ejector engages the slide 144 and sets the latter on the adjustment of the ejector 3 in height. The connection of the catch 145 with the slide 144 is such that the ejector 3 will not be hindered in its longitudinal movement.

All the ejectors 3 slide upon one-armed levers 4, having fixed pivots at 5, and are continually subjected to a pressing-roll 6 under the action of a spring. By this roll they are forced against a projection 7 on one-armed levers 8, adapted to turn upon a shaft 9. In opposition to this turning movement of the ejectors 3 the levers 8 are held in their normal position by a tappet 11 on a shaft 12, as shown. The shaft 12 has a turning movement imparted to it by a hand-lever 16, arranged outside the casing upon a shaft 15, which carries the toothed segments 14, adapted to engage with toothed segments 13 on the shaft 12. As soon as by turning the crank or lever 16, and consequently the shaft 12, the tappet 11 has released the lever 8 a downwardly-bent nose 10 at the front end of such lever passes upon a stepped disk 32, arranged to turn loosely upon a shaft 33. The difference in height of the steps of these disks 32 is equal to the thickness of the corresponding coins in the respective coin-receptacle 2. On each side of the stepped disk 32 is placed a ratchet-wheel 34 and 35, firmly connected therewith, the teeth of these ratchet-wheels being set in opposite directions. Toothed sectors 36 and 37 may at will be caused to engage with the said ratchet-wheels 34 and 35. One of the sectors 36 is connected with a key-lever 44, and the other sector 37 is connected with a key-lever 93. Of these key-levers 44 and 93 one each is designed for the units of cents, tens of cents, units of dollars, and tens of dollars, and the several keys 46 and 95, respectively, are arranged on the same with the aid of a sector 45 and 94. The turning movement of the key-levers 44 and 93 is limited in accordance with the position of the respective key on the sector by a fixed stop 50. For this purpose the keys 46 and 95 are fitted to swing about pivots 47, their turning movement being limited by stops 49, against which a tailpiece 48 of the keys 46 and 95, respectively, bear in the position of rest as well as in the operative position. Owing to the turning movement of the key in the movement of the key-lever, the tailpiece 48 is turned to such an extent that its free end will pass to the fixed stop 50 on the depression of the toothed sector, whereas the tailpieces of the keys which are at rest can pass by freely. Ordinarily the toothed sector 36 is held in engagement with its ratchet-wheel 34 by the spring 42. On the depression of any key the respective stepped disk 32 will therefore make a corresponding turning movement in the direction of the arrow 1. This is the direction of its forward movement—that is to say, the direction in which the heights of the steps increase. When this setting or adjustment of the stepped disk has been effected by the depression of the corresponding key, the said disk must be held in the position reached, while the toothed sector 36 returns to its initial position on the release of the key. For holding the stepped disk in the position reached use is made in the constructional form shown of a brake-roll provided on an arm 63, which is secured upon a shaft 64, passing through the side of the casing and taking up on the outside an arm 65, furnished at its end with a roll 67. This roll 67 is under the action of a cam 68, shown connected in the drawing, by way of example, with the toothed sector 14 on the shaft 15. Normally the spring 66, pressing upon the arm 65, causes the roll on the arm 63 to be forced against the stepped disk. As soon as, however, the crank or lever 16 is pressed down the cam 68 imparts to the arm 65 a turning movement in opposition to the action of the spring, and the brake-rolls 147 are removed from the corresponding stepped disks. The action of the brake-roll must be such that the springs 51, which serve to effect the forward movement of the stepped disk by means of a cord or the like winding upon the nave of the stepped disk or a roller attached thereto, will not be able to overcome the brake action. After the adjustment of the stepped disk 32 with the aid of the toothed sector 36 it will be necessary to effect the second adjustment—that is to say, the setting back to an extent corresponding to the amount to be paid in. For this purpose I employ for the setting to the amount of the purchase after the setting to the amount paid in the special key-levers 93 for turning back the stepped disks 32.

With the device represented in Figs. 1 and 2 is connected the indicating device (shown in Fig. 6) and the adding device. (Shown in Fig. 7.) The key-levers 93, with the sectors 94 and the keys 95, which may be arranged exactly like the key-levers 44 and limited in their movement by the same stop 50, thus serve for the adjustment to the amount paid in and are made different from the key-levers 44 as regards their color, numbers, shape, and so on to avoid mistakes. In this adjustment through the medium of the key-levers 93 to the amount of the purchase it is needful to provide a device for transfer of the tens between the stepped disks 32. In the drawings this device consists, for instance, of a double swinging lever 70 72, provided between every two stepped disks 32. These swinging levers are arranged to turn upon a shaft 80, but are immovable in the axial direction. One swinging lever 72 is submitted to the action of a tappet 71, which turns with the stepped disk of a lower order, and the other swinging lever 70 engages with the teeth of a transmitting-wheel 69, firmly connected with the stepped disk of a higher order. The tappet 71 imparts to the double swinging lever 70 72 such a turning movement that the wheel 69 will be turned one tooth in every revolution of the stepped disk 32 of a lower order. At the same time the pawl 82 passes behind the tooth 81, so that the stepped disks, tappets 71, and double levers 70 72 may not hinder each other in moving back to their normal position of rest. All these pawls are arranged to turn upon a common shaft 83, carrying outside the casing a lever-arm 91, which extends into the path of a catch 92 on the toothed sector 14, so as to be raised in the turning movement of the latter by the depression of the lever 16, and thus to release all the pawls 82 again. The double levers are then moved back again to their original position under the action of their springs 79 through the agency of a toothed sector 76, pivoted at 77, and whose teeth 75 engage with the teeth of a sector 74, fixed upon the shaft 80, which carries the said levers. As the step-disks 32 have first been set to the amount of the purchase, so that the latter adjustments, commencing with the step-disks of the highest order, take place in succession, the positions finally given them are those corresponding to the balance to be paid out. After this adjustment of the disk the coins making up the balance may be ejected from the coin-receptacles, thus delivering such balance. This takes place with the aid of the crank or lever 16. On the depression of the lever 16 the shaft 15, with the toothed sector 14, is caused to turn, thereby imparting a rotary movement to the shaft 12. In this operation the cam 11 first leaves the lever 8, whose downwardly-bent nose 10 is lowered upon the stepped disk 32. Then a toothed sector 86 on the shaft 12 engages with a rack 31, forming the end of a push-rod 30, having at its other end an arm 29, which extends upward. This arm carries a tappet 28, engaging with a forked projection 27 on the ejector 3. Therefore the ejector is actuated by the rotary movement of the shaft 12 in the depression of the crank or lever 16 and according to the adjustment in height by the stepped disk 32 conveys a certain number of coins from the corresponding coin-receptacle 2 upon a plate 26, arranged behind the same. This plate is adapted to move in a vertical guide and fixed to one end of cords 23 or the like, the other end of which is attached at 24 to the top of the casing. The cords are passed over a loose pulley 22, provided between the point of attachment 24 and a fixed pulley 25, over which the cords also travel. The loose pulleys are held by lever-arms 21, which, together with a lever-arm 19, are fixed upon a shaft 20. The lever-arm 19 extends into the path of a tappet 87, which is furnished at the end of an arm 17, firmly connected with the lever 16 and which passes through a curved slot 18 in the side of the casing. The tappet 87 acts upon the arm 19 only during the latter part of its movement, so that the loose pulley 22 will be lowered after the ejection of the coins from the receptacle to the plate 26, being then raised with the coins so ejected. It should be observed that the changing and paying out are effected in such a manner that on the depression of the key-lever 44 and of the lever 16 the delivery will take place at once without the operation of the corresponding key-lever 93. The plate 26 is raised to the position 26', indicated in dotted lines at the aperture in the top of the casing. Owing to the inclination of the plate 26 to the rear, the coins slide from it onto the top of the casing, from which they may be removed.

In practice the number of steps of the stepdisk for paying out from one to nine cents does not exceed two. If, for instance, one of the coin-receptacles contains one-cent pieces, the other two-cent pieces, and the third five-cent pieces, the delivery of one cent corresponds to one step equal in height to the thickness of a one-cent piece underneath the receptacle containing one-cent pieces, the delivery of two cents corresponds to one step equal in height to the thickness of a two-cent piece underneath the receptacle containing the two-cent pieces, the delivery of three cents corresponds to one step equal in height to the thickness of a one-cent piece underneath the receptacle containing one-cent pieces and to one step equal in height to the thickness of a two-cent piece underneath the receptacle containing two-cent pieces, the delivery of four cents corresponds to one step equal in height to the thickness of two two-cent pieces underneath the receptacle containing two-cent pieces, &c. Of course I may also provide receptacles for other current coins, such as three-cent pieces.

In the constructional form shown I have combined the device for delivering coins with devices which on the depression of the keys for the amount of the purchase will register such amount, indicate the same, and by means of an adding-machine add it to the amounts previously paid in, both the device for indicating the amount paid in and the adding device for the total being visible from the outside. The key-levers 93 have a downwardly-extending arm 96, to the end of which a toothed sector 97 is jointed. The toothed sector is forced by means of a spring 98 against a wheel 99, furnished with ratchet-teeth. These wheels 99 are carried on hollow shafts 100 101 102, passing one through the other, and on the shaft 103, passing entirely through them, as shown in Fig. 6. The shafts 102, 101, and 100 are held in bearings so that they can rotate, but cannot move in the axial direction. The hollow shaft 100 carries the type-wheel 104 for ten to ninety dollars, the shaft 101 the type-wheel 105 for one to nine dollars, the shaft 102 the type-wheel 106 for ten to ninety cents, and the shaft 103 the type-wheel 107 for one to nine cents. Upon the fixed shaft 108 are provided the indicating-wheels, the wheel 109 being designed for ten to ninety dollars, the wheel 110 for one to nine dollars, the wheel 111 for ten to ninety cents, and the wheel 112 for one to nine cents. By means of a suitable transmitting device, such as a chain-gear, connection is established between the wheels 104 and 109, 105 and wheel 110, 106 and 111, 107 and 112. In the operation of a key-lever 93 the respective ratchet-wheel 99 is turned according to the position of the keys 95, the type-wheels 104 105 106 107 being turned correspondingly and the amount to which the type-wheels are adjusted being, if desired, printed upon a strip of paper, a ticket, or the like in the well-known manner through the agency of a printing device, which may likewise be operated by means of a key or in any other desired manner. At the same time the number denoting the amount is exhibited to the purchaser through an opening 113 by the indicating-wheels 109, 110, 111, and 112. The indicating-wheels are turned back in the same manner as the stepped disk by a cord 114, which is wound up and subjected to the action of a spring 115. After the adjustment of the indicating-wheels they are fixed in position by a pawl 116 and held therein until the next adjustment takes place. On money being again paid in the release is effected with the aid of the key-levers 44, serving for the adjustment to the amount paid in. On the arms 38 of these levers are prolongations 117, coupled by the push-rod 119, with the longer arms 121 of a lever 121 118, carried upon a common shaft 20, their short arms 118 being connected by links 125 with the arms 126 of pawls 116. On the depression of the respective key-lever 44 the lever 121 118 is turned in the direction of the arrow shown in Fig. 1 and the pawl 116 is disengaged, so that the spring 115 will begin to act and the corresponding indicating-wheel will return to zero.

The adding device, Fig. 7, comprises the adding-wheel 128 for one to nine cents, the wheel 129 for ten to ninety cents, the wheel 130 for one to nine dollars, the wheel 131 for ten to ninety dollars, and the wheel 132 for one hundred to nine hundred dollars. They are all arranged to turn loosely upon the shaft 133, Figs. 1 and 7, and, as is customary with counting-wheels, bear the number upon their periphery, so as to be easily readable. The counting-wheels through the medium of wheels 134, having ratchet-teeth, are under the action of racks 135 connected by links 136 to the key-levers 93 and submitted to the action of springs 137, which keep the racks continually in engagement with the wheels 134. Pawls 143 serve to prevent the counting-wheels moving back. Between the wheels 128, 129, 130, 131, and 132 are provided means which may be of any well-known kind for transmitting the tens. The wheel 132 is not driven from a key, only the means for transmitting the tens being actuated from the wheel 131 in order to add the amounts from one hundred to nine hundred dollars.

What I claim as my invention, and desire to secure by Letters Patent, is—

1. In a device of the character set forth, the combination of coin-receptacles, horizontal slides at the bottom of the said receptacles for ejecting the coins from the latter, slide-supporting levers for supporting the said slides, stepped disks for adjusting the said slides in height, these disks being arranged to turn independently of each other, a shaft for supporting the said disks, one-armed levers, projections on these levers, one of these projections bearing against the slide-supporting levers and the other bearing upon the stepped disks, tappets adapted to lift the said one-armed levers, and means for imparting a turning movement to the said stepped disks independently of each other, substantially as described.

2. In a device of the character set forth, the combination of coin-receptacles, horizontal slides at the bottom of the said receptacles for ejecting the coins from the latter, vertical slides at the back of these receptacles for controlling the delivery of the coins, catches on the horizontal slides for setting the said vertical slides, slide-supporting levers for supporting the said horizontal slides, stepped disks for adjusting the said slides in height, these disks being arranged to turn independently of each other, a shaft for supporting the said disks, one-armed levers, projections on these levers, one of these projections bearing against the slide-supporting levers and the other bearing upon the stepped disks, tappets adapted to lift the said one-armed levers, and means for imparting a turning movement to the said stepped disks independently of each other, substantially as described.

3. In a device of the character set forth, the combination of coin-receptacles, horizontal slides at the bottom of these receptacles for ejecting the coins from the latter, stepped disks for adjusting the said slides in height, these disks being arranged to turn independently of each other, a shaft for supporting the said disks, one-armed levers, projections on these levers, slide-supporting levers, against which one of the said projections bears while the other projection bears upon the stepped disks, tappets adapted to lift the said one-armed levers, a shaft carrying the said tappets, a hand-lever, a shaft upon which this hand-lever is fixed, and toothed sectors one of which is fixed on each of these shafts and gearing with each other, substantially as described.

4. In a device of the character set forth, the combination of coin-receptacles, horizontal slides at the bottom of the said receptacles for ejecting the coins from the latter, levers for supporting these slides, a shaft, stepped disks mounted loosely upon this shaft, one-armed levers, downwardly-bent noses on these levers, bearing upon the said stepped disks, ratchet-wheels, connected with these stepped disks, and means for operating the said ratchet-wheels, substantially as described.

5. In a device of the character set forth, the combination of coin-receptacles, horizontal slides at the bottom of the said receptacles for ejecting the coins from the latter, levers for supporting these slides, a shaft, stepped disks mounted loosely upon this shaft, one-armed levers, downwardly-bent noses on these levers bearing upon the said stepped disks, ratchet-wheels connected with the said stepped disks and having their teeth set in opposite directions, toothed sectors adapted to engage with these ratchet-wheels, and key-levers connected with the toothed sectors, substantially as and for the purpose described.

6. In a device of the character set forth, the combination of coin-receptacles, slides on these receptacles for ejecting the coins from the latter, levers for supporting these slides, one-armed levers, downwardly-bent noses on these levers, a shaft, stepped disks mounted loosely upon the said shaft, ratchet-wheels upon such shaft, toothed sectors adapted to engage with these ratchet-wheels, key-levers connected with the toothed sectors, keys fitted to turn about pivots, stops for limiting the movement of the said keys, and fixed stops for limiting the movement of the key-levers, substantially as and for the purpose described.

7. In a device of the character set forth, the combination of stepped disks, springs, cords attached to said springs and wound round the naves of the disks, a shaft provided with arms, brake-rolls pivoted on said arms and adapted to bear against the said disks, an arm on the said shaft, a roll pivoted to this arm, a spring bearing against the same, a shaft carrying a hand-lever, a cam fixed on this shaft and adapted to act upon the aforesaid roll, substantially as described.

8. In a device of the character set forth, the combination of a shaft, stepped disks adapted to turn loosely thereon, a shaft arranged parallel to the aforesaid shaft, swinging toothed sectors arranged upon the latter shaft, springs bearing upon these sectors, tappets fitted to turn with some of the stepped disks, transmitting-wheels connected with others of the stepped disks, pairs of pawls, a shaft arranged parallel to the shaft of the stepped disks, and carrying these pairs of pawls, toothed sectors connected with the pairs of pawls and engaging with the aforesaid swinging toothed sectors, and lever-arms corresponding to the said pairs of pawls and connected with some of the stepped disks, substantially as described.

9. In a device of the character set forth, the combination of coin-receptacles, slides for ejecting the coins from such receptacle, forked projections on these slides, a push-rod forming a rack, a tappet provided on this push-rod and engaging with the said fork, a shaft, a toothed sector fixed on this shaft and adapted to engage with the said rack, a second shaft, arranged parallel to the first, a hand-lever fixed upon the outer end of this shaft, a toothed sector carried upon the latter, and a toothed sector connected with the hand-lever and engaging the aforesaid toothed sector, substantially as described.

10. In a device of the character set forth, the combination of coin-receptacles, slides at the bottom of the receptacles for ejecting the coins from the latter, an inclined plate placed behind the receptacles and adapted to receive the coins ejected, vertical guides for the said plate, cords attached to the ends of such plate at one end and to fixed points at the other end, fixed pulleys for guiding the cords, levers, loose pulleys carried at the ends of the said levers and under which the cords pass, and means for imparting movement to the said levers, substantially as described.

11. In a device of the character set forth, the combination of coin-receptacles, slides at the bottom of the receptacles for ejecting the coins from the latter, an inclined plate adapted to receive the coins ejected, vertical guides for the said plate, cords attached to such plate at one end and to fixed points at the other end, fixed pulleys for guiding the cords, double-armed levers, a roll arranged at the end of one arm of these levers and under which the cords pass, a shaft in which the double-armed levers are pivoted, a hand-lever, a shaft to which this lever is fixed, an arm connected with the said hand-lever, a tappet carried by the said arm and adapted to strike against one arm of the aforesaid double-armed lever, substantially as and for the purpose described.

12. In a device of the character set forth, the combination of stepped disks, a set of key-levers for operating these disks, downwardly-extending arms fixed on these levers, toothed sectors pivoted to the said arms, springs bearing upon the sectors, ratchet-wheels adapted to engage with the sectors, shafts extending one through the other and carrying the said ratchet-wheels, type-wheels fixed on the said shafts, a fixed shaft arranged parallel to the latter, indicating-wheels carried loosely by the first shaft, and means for transmitting movement from the shafts of the said type-wheels to the indicating-wheels, substantially as and for the purpose described.

13. In a device of the character set forth, the combination of a set of key-levers, downwardly-extending arms thereon, springs for retracting these arms, toothed sectors pivoted to the said arms, ratchet-wheels adapted to engage with these sectors, shafts extending one through the other and carrying the said ratchet-wheels, type-wheels fixed on these shafts, a fixed shaft arranged parallel to the latter, indicating-wheels carried loosely by the fixed shaft, springs for turning back the indicating-wheels, cords attached to these springs at one end and to the indicating-wheels at the other end, ratchet-wheels connected to the indicating-wheels, pawls adapted to engage with the said ratchet-wheels, two-armed levers, links connecting the short arms of the two-armed levers to the said pawls, a second set of key-levers, downwardly-extending arms thereon, and rods connecting these arms to the long arms of the said two-armed levers, substantially as and for the purpose described.

In testimony whereof I have signed my name to this specification in the presence of two subscribing witnesses.

EDUARD JANIK.

Witnesses:
 ALVESTO S. HOGUE,
 AUGUST FUGGER.